US011335208B2

(12) United States Patent
Luyckx et al.

(10) Patent No.: US 11,335,208 B2
(45) Date of Patent: May 17, 2022

(54) DEVICE AND METHOD FOR IDENTIFYING A USER

(71) Applicant: WORLDLINE, Brussels (BE)

(72) Inventors: Luc Luyckx, Bornem (BE); Pierrot Baessens, Sint-Pieters-Leeuw (BE)

(73) Assignee: WORLDLINE, Brussels (BE)

( * ) Notice: Subject to any disclaimer, the term of this patent is extended or adjusted under 35 U.S.C. 154(b) by 0 days.

(21) Appl. No.: 16/969,657

(22) PCT Filed: Feb. 15, 2019

(86) PCT No.: PCT/EP2019/053863
§ 371 (c)(1),
(2) Date: Aug. 13, 2020

(87) PCT Pub. No.: WO2019/158715
PCT Pub. Date: Aug. 22, 2019

(65) Prior Publication Data
US 2020/0402423 A1    Dec. 24, 2020

(30) Foreign Application Priority Data

Feb. 16, 2018   (BE) .................................. 2018/5093

(51) Int. Cl.
*G09B 21/00*         (2006.01)
*G06F 9/451*         (2018.01)
(Continued)

(52) U.S. Cl.
CPC ........... *G09B 21/005* (2013.01); *G06F 3/016* (2013.01); *G06F 3/04842* (2013.01);
(Continued)

(58) Field of Classification Search
CPC ... G09B 21/005; G09B 21/001; G07F 19/206; G06F 3/016; G06F 3/04895; G06F 3/167;
(Continued)

(56) References Cited

U.S. PATENT DOCUMENTS 8,301,200 B1 * 10/2012 Lee .......................... H04M 1/26
455/566
8,654,079 B1 * 2/2014 Shipley ................. G06F 3/0238
345/168
(Continued)

OTHER PUBLICATIONS

International Search Report from corresponding International Application No. PCT/EP2019/053863, dated May 21, 2019, pp. 1-3, European Patent Office, Rijswijk, Netherlands.

*Primary Examiner* — Justin R. Blaufeld
(74) *Attorney, Agent, or Firm* — Hauptman Ham, LLP

(57) ABSTRACT

A device and method for identifying a user. The device including a terminal including a touch screen with a set of embossments superimposed on a virtual keyboard and displaying information related to a transaction, a contact and/or contactless smart card reader device, a processor and a memory containing a set of modules and/or algorithms to implement the method including activation of a low vision mode by a double-tap gesture on the screen, the searching for the center of a virtual keyboard where an embossment is located, determination of the positions of the other keys from the central key, choice and storage of a desired key by lifting the finger from the touch screen at the position of the desired key, validation of the choice of key made by a double-tap gesture on the touch screen or validation of the code/PIN by a double-tap gesture on the touch screen.

22 Claims, 5 Drawing Sheets

(51) Int. Cl.
*G06F 3/01* (2006.01)
*G06F 3/04842* (2022.01)
*G06F 3/04886* (2022.01)
*G06F 3/04895* (2022.01)
*G06F 3/16* (2006.01)
*G07F 19/00* (2006.01)

(52) U.S. Cl.
CPC ...... *G06F 3/04886* (2013.01); *G06F 3/04895* (2013.01); *G06F 3/167* (2013.01); *G06F 9/453* (2018.02); *G07F 19/206* (2013.01); *G06F 2203/04803* (2013.01); *G06F 2203/04809* (2013.01); *G09B 21/001* (2013.01)

(58) Field of Classification Search
CPC .. G06F 3/04886; G06F 3/04842; G06F 9/453; G06F 2203/04803
See application file for complete search history.

(56) References Cited

U.S. PATENT DOCUMENTS

| | | | |
|---|---|---|---|
| 2006/0181515 A1 | 8/2006 | Fletcher et al. | |
| 2007/0198949 A1* | 8/2007 | Rummel | G06F 3/0482 715/810 |
| 2011/0083104 A1* | 4/2011 | Minton | G06F 3/04886 715/815 |
| 2012/0084075 A1* | 4/2012 | Yamada | G06F 3/167 704/9 |
| 2015/0332038 A1* | 11/2015 | Ramsden | G06F 21/32 726/19 |
| 2015/0347008 A1* | 12/2015 | Oldziejewski | G06F 3/04847 715/773 |
| 2016/0224113 A1* | 8/2016 | Day | G06F 3/04886 |
| 2017/0046025 A1* | 2/2017 | Dascola | G06F 3/04883 |

\* cited by examiner

DEVICE AND METHOD FOR IDENTIFYING A USER

RELATED APPLICATIONS

The present application is a National Phase of International Application Number PCT/EP2019/053863, filed Feb. 15, 2019, and claims priority to Belgium Application No. 2018/5093, filed Feb. 16, 2018.

TECHNICAL FIELD OF THE INVENTION

The present invention relates to the field of authentication and/or control of the identity of a user requesting a service or carrying out a transaction, more specifically the invention relates to a device and a method for identifying a person and which also supports partially sighted persons.

TECHNOLOGICAL BACKGROUND OF THE INVENTION

The request for a service provided by a service provider or the validation of a transaction, for example and without limitation the payment of a product, generally requires an identification step. The identification devices, generally, may comprise means such as a physical keyboard or a virtual keyboard so as to validate the transaction. However, a main problem encountered in the identification process is the identification of partially sighted persons (visually impaired persons).

There are identification devices adapted for the partially sighted persons, but said devices may have a complex identification process which may lead to many errors and thus make the devices less ergonomic.

GENERAL DESCRIPTION OF THE INVENTION

The object of the present invention is to overcome a certain drawback of the prior art by providing a means for the authentication or the check of the identity of people including partially sighted persons.

This aim is achieved by a device for identifying a user including at least one terminal comprising at least one touch screen for displaying information related to at least one transaction or one service, a location for inserting a smart card, a contact or contactless smart card reader device, a main circuit board for controlling the functionalities of said terminal and comprising at least one processor and one memory, said memory containing a set of modules and/or algorithms, whose execution on the processor implements at least one set of functionalities of said terminal and/or generates at least one interactive interface comprising at least one virtual keyboard, the terminal comprising at least one arrangement for the activation of a low vision mode for partially sighted users wherein:
- a positioning module determines the position of the finger on the touch screen and records in a first memory the last position of said finger after said user has removed his finger from said touch screen, said last position being defined as a possible choice of the virtual key corresponding to said last memorized position;
- a detection device comprises at least one arrangement for validating the choice of the user by a double-tap gesture of the finger anywhere on the touch screen, the validated choices being registered in a second memory and sorted in order of recording by means of an algorithm so as to constitute a code/PIN used to validate the transaction and/or to trigger a functionality of said terminal;

wherein the touch screen of said terminal comprises at least one set of embossments that are superimposed on the keys of the virtual keyboard such that the embossments are located around the digits and/or symbols of said keys, said set of embossments including an embossment with a point in the center and located in the center of the first nine keys, comprising digits, of said virtual keyboard displayed by the touch screen so as to allow a user to locate the central key of the virtual keyboard and the other keys around said central key.

According to another feature, the low vision mode for partially sighted users is activated when the terminal is in a PIN entry mode.

According to another feature, when the low vision mode is activated by a user, the terminal comprises an algorithm whose execution activates a discovery mode in which the user moves his finger on the touch screen and discovers the layout without activating a functionality of said terminal.

According to another feature, the terminal exits the discovery mode when the user locates with his finger the central key corresponding to the digit "5" of the virtual numeric keyboard, the position of the other keys, defined by a first part of the set of embossments corresponding to the digits "0", "1", "2", "3", "4", "6", "7", "8", "9" and a second part of the embossments having the symbols "<", "X" and 'O', being determined from said central key by keeping the finger on the touch screen and moving it upward, downward, leftward or rightward or by a combination of at least two of said directions (up, down, left, right) toward the desired key.

According to another feature, the discovery mode is automatically activated after each double-tap gesture and deactivated when the user finds the central key.

According to another feature, the terminal comprises an algorithm for comparing the position of each choice registered in the first memory of said terminal with the predefined position of each key of the virtual keyboard before the validation of said choice.

According to another feature, the terminal comprises at least one alarm connected to the detection device, said alarm emitting a beep signal when said detection device validates a choice made by the user.

According to another feature, the terminal comprises an arrangement for configuring a first duration for which the finger is in contact with the touch screen of said terminal and a second duration between two successive tap-gestures of the finger so as to avoid an error in the process of validation of a choice when said durations exceed predefined values registered in the memory of the processor of the terminal.

According to another feature, the virtual keyboard of the interface of the terminal comprises at least one correction key, identified by the position of an embossment of the set of embossments having the symbol "<", which is activated by a double-tap gesture of the user's finger on the touch screen in order to correct a choice made by said user once the finger has been removed from the screen in the position identified as representing this correction symbol.

According to another feature, the terminal deletes, by means of an arrangement, the last choice made by a user from the first memory when the correction key is activated by said user.

According to another feature, the alarm of the terminal emits a signal with a low frequency and a longer duration, distinguishable from a beep signal, when the choice made by the user has been deleted.

According to another feature, the virtual keyboard of the interface of the terminal comprises a cancel key, identified by the position of an embossment of the set of embossments having the symbol "X", which is activated by a double-tap gesture of the user's finger on the touch screen in order to cancel a code/PIN or to exit the PIN entry mode once the finger has been removed from the screen in the position identified as representing this cancellation symbol.

According to another feature, when the cancel key is activated by the user, the terminal deletes, by means of an arrangement, a code/PIN from the second memory if a code/PIN has already been registered in said memory or exits the PIN entry mode if a code/PIN has not been registered in said second memory or if a choice has not been made.

According to another feature, the alarm of the terminal emits a signal when a code/PIN is canceled, said signal being different from the beep signal emitted when a choice is validated or from the signal emitted when a correction has been made.

According to another feature, after a code/PIN has been entered by the user, said code/PIN is validated by a double-tap gesture of the finger of said user on the touch screen of the terminal.

According to another feature, the terminal comprises an arrangement for automatically exiting the PIN entry mode when said mode ends.

According to another feature, the embossment with the symbol "O" corresponds to the OK key of the virtual keyboard in a normal mode for a user with normal vision, said OK key being used, by a tap-gesture, to validate a code/PIN typed using the virtual keyboard or to confirm a transaction or an instruction/information displayed on the screen of the terminal.

According to another feature, the terminal comprises an arrangement for automatically validating the code/PIN after a predefined number of digits, registered in the memory of said processor of the terminal, have been typed by a user.

According to another feature, the terminal comprises an audio arrangement for providing audio assistance to a user of said terminal.

According to another feature, when the low vision mode is activated, the audio arrangement activates a voice assistance module, included in said audio arrangement, which says "ENTRY IN LOW VISION PIN ENTRY MODE".

According to another feature, when the correction of a choice has been made by activating the correction key, the audio arrangement activates the voice assistance module which says correction.

According to another feature, when a code/PIN or a PIN entry mode has been canceled by activating the cancel key, the audio arrangement activates the voice assistance module which says "OPERATION CANCELED".

Another aim of the present invention is to provide a process for the authentication of a partially sighted (visually impaired) user.

This aim is obtained by a method for identifying a partially sighted user, in a device comprising a terminal as described above, said method comprising at least one of the following steps:
- the activation of a low vision mode by a double-tap gesture of the finger of said user on the screen of the terminal;
- the searching for the center of the keyboard on the touch screen where an embossment with a point, corresponding to the central key of the virtual keyboard of the terminal, is located;
- the determination of the positions of the other keys of the virtual keyboard from said central key, by keeping the finger in contact with the touch screen and moving it upward, downward, rightward, leftward or by a combination of said directions (up, down, right, left) to feel the other embossments of the touch screen representing the other keys;
- the choice and the storage of a desired key by lifting the finger from the touch screen at the position of said desired key;
- the validation of the choice of key made by a double-tap gesture anywhere on the touch screen;
- the validation of the code/PIN made up of all the choices validated by a double-tap gesture anywhere on the touch screen and once the number of digits of the code corresponds to the number of validated key choices.

According to another feature, the method comprises steps of correcting choices when at least one wrong choice has been made, said steps comprising at least one of:
- the selection of the correction key on the virtual keyboard of the terminal by moving the finger downward from the central key "5" toward said correction key located below said digit "0";
- the activation of said correction key by a double-tap gesture on the touch screen of the terminal;
- the emission of a signal or a voice to confirm the correction.

According to another feature, the method comprises steps of canceling a code/PIN or exiting the PIN entry mode, said steps comprising at least one of:
- the selection of the cancel key on the virtual keyboard by moving the finger downward from the central key "5" toward said cancel key;
- the activation of said cancel key by a double-tap gesture on the touch screen of the terminal;
- the emission of a signal or a voice to confirm the cancellation of the operation.

DESCRIPTION OF THE ILLUSTRATIVE FIGURES

Other features and advantages of the present invention will emerge more clearly upon reading the description below, given with reference to the appended drawings, wherein.

DESCRIPTION OF THE PREFERRED EMBODIMENTS OF THE INVENTION

The present invention relates to a device for the identification of a user, including a visually impaired user, during a transaction or an access to a service provided by a service provider.

Figure 4:
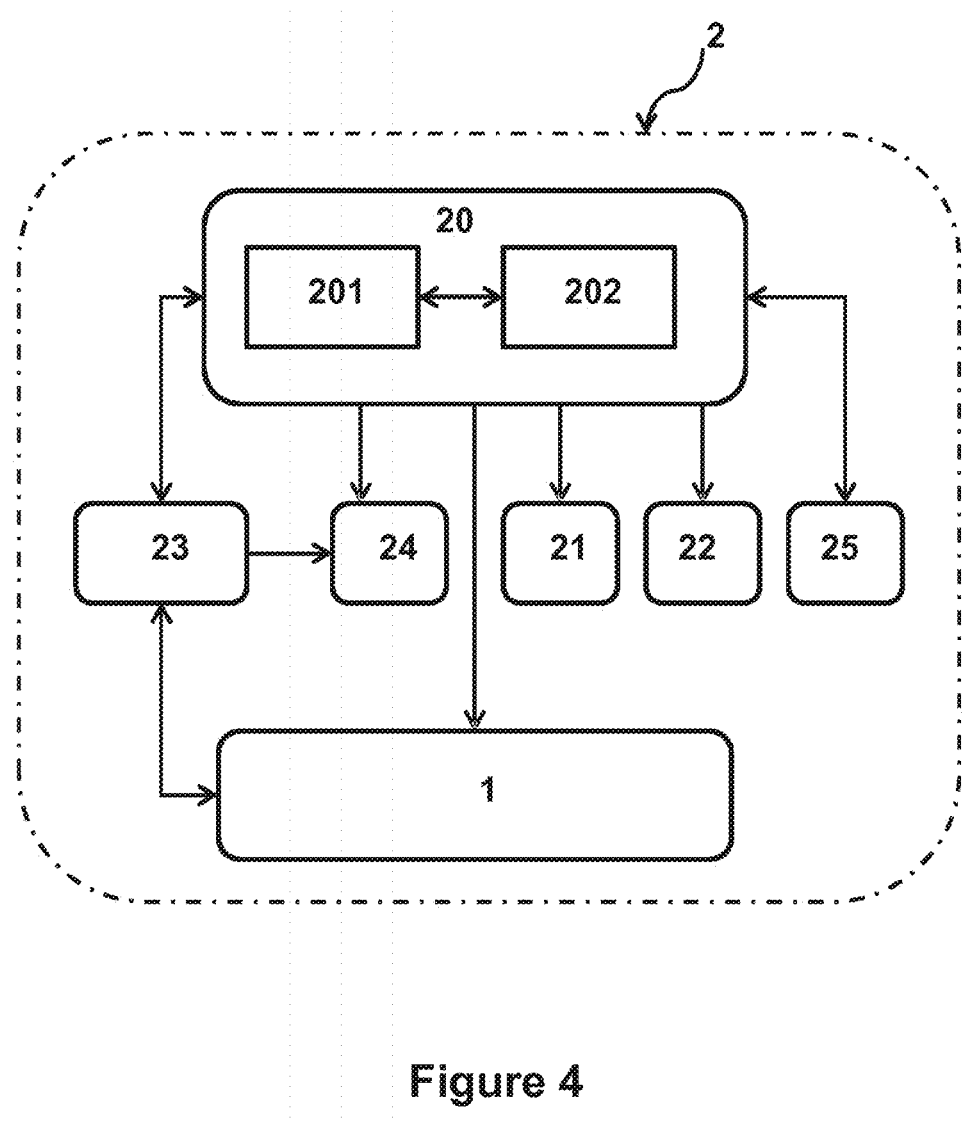
FIG. 4 is a schematic representation of the components of the terminal.

In some embodiments, the device for the identification of a user requesting a service (for example without limitation a video surveillance service) or performing a transaction also supports an identification of a partially sighted user. The device includes at least one terminal (2, FIG. 4) comprising at least one touch screen (1, FIGS. 1A, 1B, 2A, 2B, 3A, 3B and 4) for displaying information related to at least one transaction or one service, a location for inserting a smart card, a contact and/or contactless smart card reader device, a main circuit board (main circuit) (20, FIG. 4) for controlling the functionalities of said terminal (2) and comprising at least one processor (201) and one memory (202), said memory (202) containing a set of modules and/or algorithms whose execution on the processor (201) implements at least one set of functionalities of said terminal (2) and/or generates at least one interactive interface comprising at least one virtual keyboard (10), the terminal comprising at least one arrangement for the activation of a low vision mode for partially sighted users wherein:

a positioning module determines the position of the finger on the touch screen (1) and records in a first memory (21) the last position of said finger after said user has removed his finger from said touch screen (1), said last position being defined as a possible choice of the virtual key corresponding to said last memorized position;

a detection device (23) comprises at least one arrangement for validating the choice of the user by a double-tap gesture of the finger anywhere on the touch screen (1), the validated choices being registered in one second memory (22) and sorted in order of recording by means of an algorithm so as to constitute a code/PIN used to validate the transaction and/or trigger a functionality of said terminal (2), wherein the touch screen (1) of said terminal (2) comprises at least one set of embossments that are superimposed on the keys of the virtual keyboard such that the embossments are located around the digits and/or symbols of said keys, said set of embossments including an embossment (11) with a point in the center and located in the center of the first nine keys, comprising digits, of said virtual keyboard displayed by the touch screen (1) so as to allow a user to locate the central key (100) of the virtual keyboard (10) and the other keys (101, 102, 103, 104) around said central key (100). For example, and in a non-limiting manner, if the digits of the keys of the keyboard are respectively (from top to bottom) "1", "2", "3", "4"; "5", "6", "7", "8", "9" and "0", so the first nine keys correspond to the set "1", "2", "3", "4"; "5", "6", "7", "8", "9" and the central key is the one with the digit "5".

It will be understood that the embossment touch screen is integrated into the terminal and is not a device that can be superimposed on the screen of a terminal.

By transaction, it is meant the access to a service or information or a product (for example and without limitation a computer) by means of a payment card.

Figures 1A, 1B:
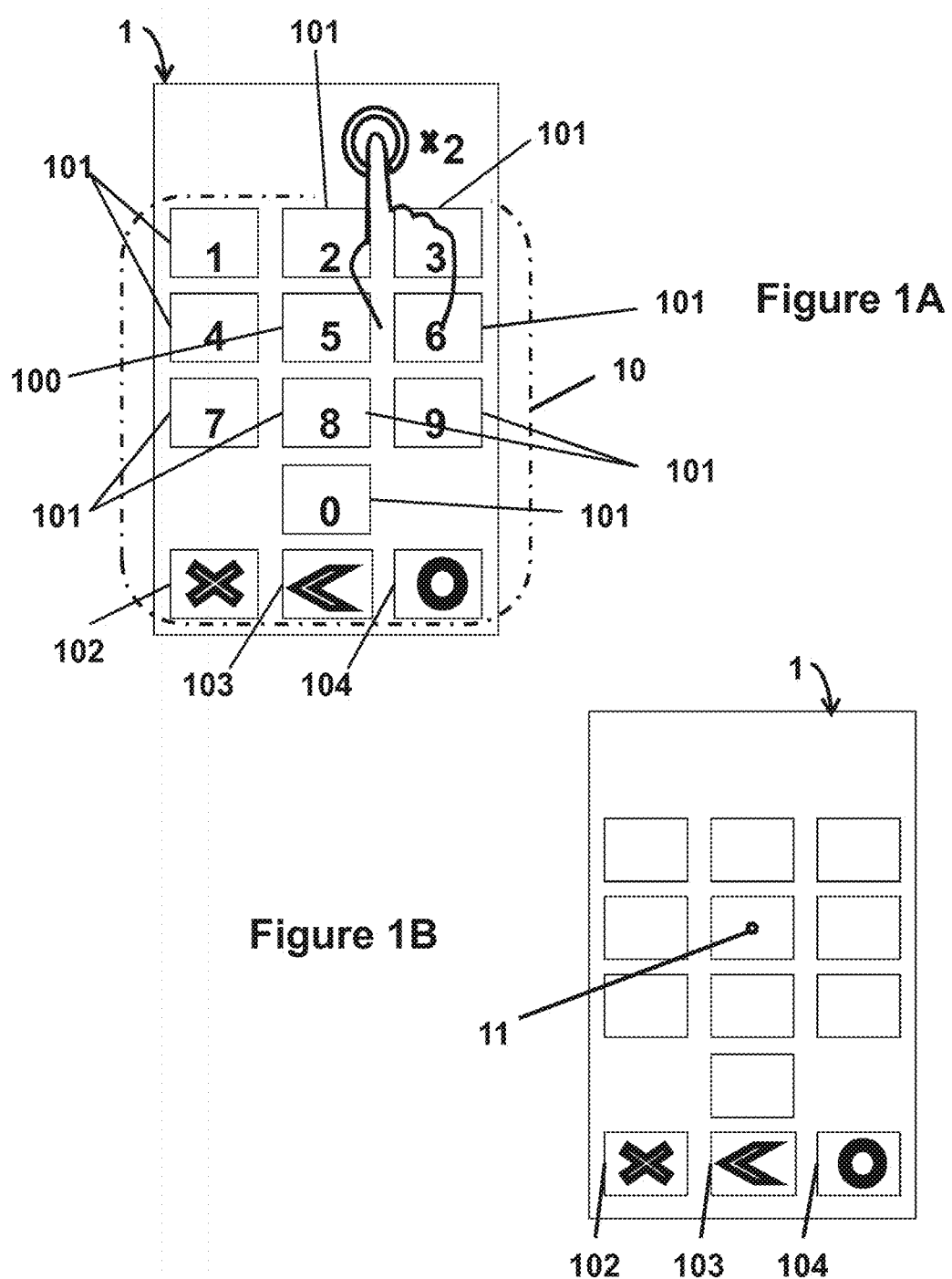
FIGS. 1A and 1B are schematic representations of the touch screen of the terminal showing the location respectively of the embossments superimposed on the virtual keyboard and of the embossments of said touch screen, according to one embodiment.

Preferably, the digits of the keys are disposed in order (from top to bottom) as "1", "2", "3", "4"; "5", "7", "8", "9" and "0" as illustrated in FIG. 1A. In some embodiments, the digits can be disposed in order (from top to bottom) as "7", "8", "9", "4"; "5", "6", "1", "2", "3" and "0".

Preferably, each embossment of the set of embossments has a rectangular shape as illustrated in the FIGS. 1A and 1B for example.

In some embodiments, each embossment of the set of embossments may have a circular shape.

The terminal comprises a normal mode set by default and appropriate for a user without visual problem (with normal vision) and operating as a usual identification or transaction terminal such as a payment terminal for example and without limitation.

The device and/or the terminal may comprise an arrangement, first, to identify whether a user is or is not a partially sighted person before the activation of the low vision mode. Preferably, the terminal comprises an audio arrangement (25) for providing assistance to a user of said terminal and/or identifying whether said user is a partially sighted person. For example and without limitation, the audio arrangement can communicate interactively with a user and require information such as: "Do you want to activate the low vision mode? If yes, then double-tap the screen, if not tap the screen once".

In some embodiments, the low vision mode for partially sighted users is activated when the terminal (2) is in a PIN entry mode. The terminal of the device comprises at least one arrangement for automatically activating the PIN entry mode when a user requesting a service wishes to validate the transaction related to said service or a functionality of said terminal. For example and without limitation, a user may want to pay for a product by means of a payment card or request information related to a service he wishes to follow, the access to said information requiring an authentication.

Figure 2A:
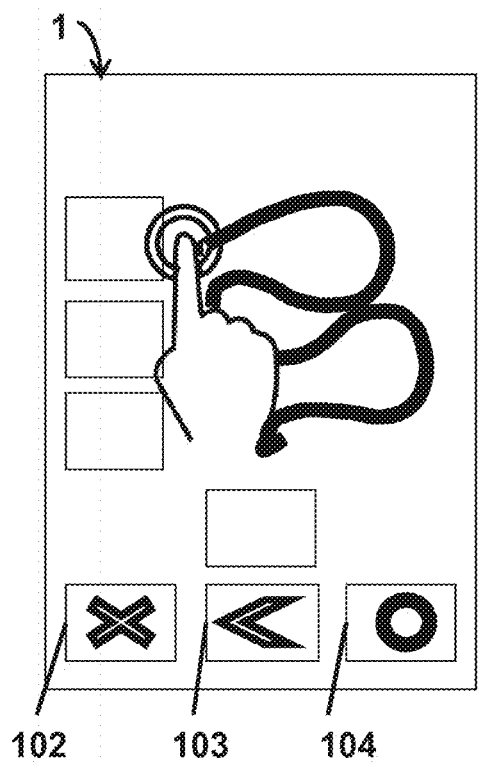
FIGS. 2A and 2B are schematic representations respectively of the discovery mode of the terminal and of the location of the central key of the virtual keyboard of said terminal, according to one embodiment.
Figure 2B:
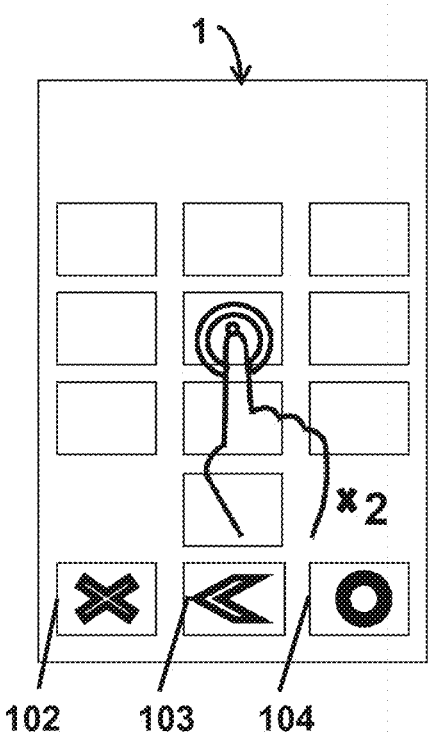
Figure 3A:
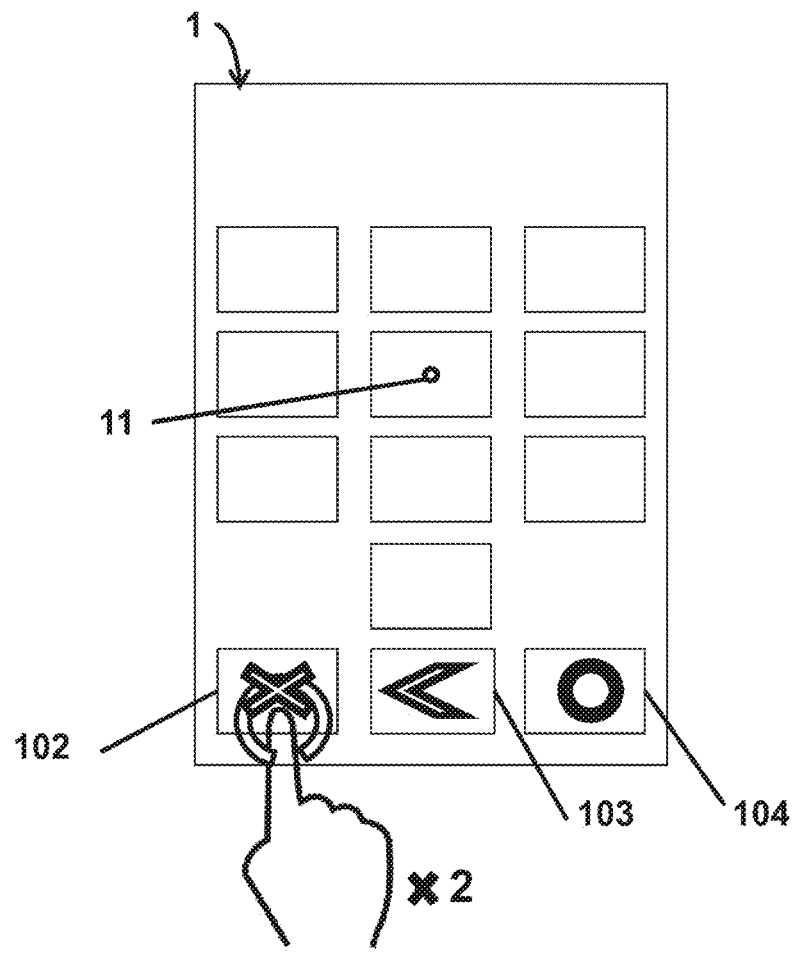
FIGS. 3A and 3B are schematic representations respectively of the gesture for canceling a code/PIN and an example of two different gestures (P1) and (P2) for dialing the digit "3" of the virtual keyboard, according to one embodiment.
Figure 3B:
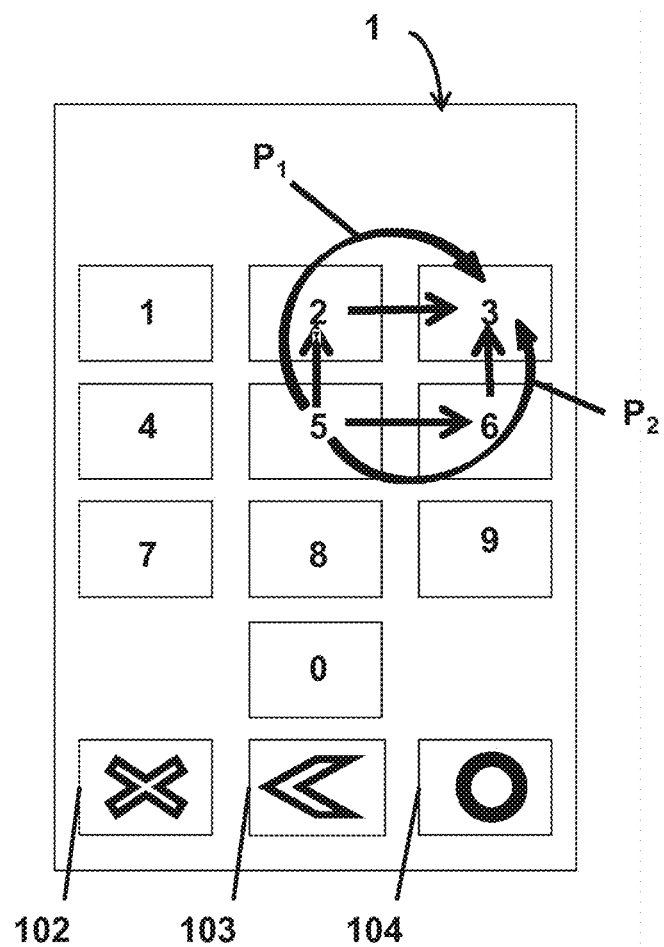

In some embodiments, when the low vision mode is activated by a user, the terminal (2) comprises an algorithm whose execution activates a discovery mode in which the user moves his finger on the touch screen (1) and discovers the layout without activating a functionality of said terminal (2), as illustrated in FIG. 2A.

In some embodiments, in said discovery mode, the user (partially sighted person) can also interrupt the contact of his finger with the screen (that is to say lift his finger from the screen) and continue the discovery on another location on the screen. Thus, the discovery mode allows the user (visually impaired person) to know where the keys are located on the screen.

In some embodiments, the terminal (2) exits the discovery mode when the user locates with his finger the central key (100) corresponding to the digit "5" of the virtual numeric keyboard (see FIG. 2B), the position of the other keys (101), defined by a first part of the set of embossments corresponding to the digits "0", "1", "2", "3", "4", "6", "7", "8", "9" and a second part of the embossments having (or with) the symbols "<" (102), "X" (103) and "O" (104), being determined from said central key (100) by keeping the finger on the touch screen (1) and moving it upward, downward, leftward or rightward or by a combination of at least two of said directions (up, down, left, right) toward the desired key (101, 102, 103, 104).

For example and without limitation, if the user wants to choose the key (101) corresponding to the digit "2", he can move his finger upward from the central key (100) corresponding to the digit "5". If the choice of the user concerns the key corresponding to the digit "3", he can first move his finger upward from the central key (100) corresponding to the digit "5" toward the key corresponding to the digit "2" and, move his finger rightward from said digit "2" toward the key corresponding to the digit "3" as illustrated by the gesture (P1) in FIG. 3B, or he can move his finger rightward from the central key (100) corresponding to the digit "5" toward the key corresponding to the digit "6" and, move his finger upward from said digit "6" toward the key corresponding to the digit "3" as illustrated by the gesture (P2) in FIG. 3B.

In some embodiments, the embossment with the symbol "O" corresponds to the OK key of the virtual keyboard. In normal mode, said OK key can be used to validate a code/PIN typed using the virtual keyboard or to confirm a transaction or an instruction/information displayed on the screen of the terminal. In said normal mode, the user can press or use a tap-gesture on said OK key for the validation or confirmation process.

In some embodiments, the terminal may comprise an arrangement for automatically validating the code/PIN after a predefined number of digits, registered in the memory of said terminal, have been typed by a user.

The validation of the code/PIN can thus depend on the type of card used for the transaction. For example and without limitation, if the card used is a Mastercard or a Visa card, the process of validation of the code/PIN may require manual validation of said code/PIN by pressing the OK key, and for a type of card such as a "Bancontact" card, for example, the code/PIN can be validated automatically after four digits.

In some embodiments, the discovery mode is automatically activated after each double-tap gesture and deactivated when the user finds the central key (100). This functionality of the terminal allows the user to locate the central key (100) after each choice so as to dial or choose easily the other digits (101, 102, 103, 104) and/or to avoid the accidental activation of a key or a digit.

In some embodiments, the terminal (2) comprises an algorithm for comparing the position of each choice registered in the first memory (21) of said terminal (2) with the predefined position of each key (100, 101, 102, 103, 104) of the virtual keyboard (10), registered in the memory of the processor of the terminal, before the validation of said choice.

In some embodiments, the touch screen comprises at least one virtual grid on which the position of each point of the touch screen and particularly the keys of the virtual keyboard can be described by coordinates (x, y). When the user makes a choice, say the digit "4" for example, the position $(x_4, y_4)$ is registered in the first memory. Thus, the comparison algorithm compares the coordinates $(x_4, y_4)$ with those of the keyboard keys. The comparison can be, for example and without limitation, checking whether $x_4$ and $y_4$ correspond or not to the x and y of one of the predefined positions. The comparison can also be made by a calculation of the distances between the position of the choice $(x_4, y_4)$ and each of the predefined position and then by comparing said distances with a predefined threshold value registered in the memory of the processor (202) of the terminal. If a distance corresponding to a given predefined value is less than the threshold value then, said choice is validated as said predefined position. In the event that there are at least two equal distances corresponding to two different predefined positions, the terminal can activate the audio arrangement (25) to ask the user to redial his last choice.

In some embodiments, the terminal (2) comprises at least one alarm (24) connected to the detection device (23), said alarm (24) emitting a beep signal when said detection device (23) validates a choice made by the user.

In some embodiments, the terminal (2) comprises an arrangement for configuring a first duration for which the finger is in contact with the touch screen (1) of said terminal and a second duration between two successive tap-gestures of the finger so as to avoid an error in the process of validation of a choice when said durations exceed predefined values registered in the memory (202) of the processor of the terminal.

In some embodiments, the virtual keyboard (10) of the interface of the terminal (2) comprises at least one correction key (103), identified by the position of an embossment of the set of embossments having the symbol "<", which is activated by a double-tap gesture of the user's finger on the touch screen (1) in order to correct a choice made by said user once the finger has been removed from the screen in the position identified as representing this correction symbol.

The terminal (2) can delete, by means of an arrangement, the last choice made by a user from the first memory (21) when the correction key (103) is activated by said user.

In some embodiments, the alarm (24) of the terminal (2) emits a signal with a low frequency and a longer duration, distinguishable from a beep signal, when the choice made by the user has been deleted.

In some embodiments, the virtual keyboard (10) of the interface of the terminal (2) comprises a cancel key (102), identified by the position of an embossment of the set of embossments having the symbol "X", which is activated by a double-tap gesture of the user's finger (see FIG. 3A) on the touch screen (1) in order to cancel a code/PIN or to exit the PIN entry mode once the finger has been removed from the screen in the position identified as representing this cancellation symbol.

In some embodiments, when the cancel key (102) is activated by the user, the terminal (2) can delete, by means of an arrangement, a code/PIN from the second memory (22) if a code/PIN has already been registered in said memory (22) or exits the PIN entry mode if a code/PIN has not been registered in said second memory (22) or if a choice has not been made.

In some embodiments, the alarm (24) of the terminal (2) can emit a signal when a code/PIN is canceled, said signal being different from the beep signal emitted when a choice is validated or from the signal emitted when a correction has been made.

In some embodiments, after a code/PIN has been entered by the user, said code/PIN is validated by a double-tap gesture of the finger of said user on the touch screen (1) of the terminal (2).

In some embodiments, the terminal (2) comprises an arrangement for automatically exiting the PIN entry mode when said mode ends.

In some embodiments, the terminal (2) comprises an audio arrangement (25) for providing audio assistance to a user of said terminal (2).

In some embodiments, when the low vision mode is activated, the audio arrangement (25) activates a voice assistance module, included in said audio arrangement (25), which says "ENTRY IN LOW VISION PIN ENTRY MODE".

In some embodiments, when the correction of a choice has been made by activating the correction key (103), the audio arrangement (25) activates the voice assistance module which says correction.

In some embodiments, a code/PIN or a PIN entry mode has been canceled by activating the cancel key (102), the audio arrangement (25) activates the voice assistance module which says "OPERATION CANCELED".

In some embodiments, the payment terminal is configured to be integrated into a vending machine comprising at least one jack connector and one device for detecting the presence of a plug (or socket) plugged into the connector for the connection of an audio headset. The terminal can comprise at least one connection device (for example and without limitation a USB cable, etc.), to communicate bidirectionally with said vending machine. The machine transmits a transaction request to the terminal (for example and without limitation an electrical signal) through the connection device, after the connection of an audio headset by a user. The user is then guided, by the terminal, to perform the transaction.

The present invention also relates to a method for identifying a visually impaired user in a device comprising a terminal (2) as described above (in the present application).

In some embodiments, the method for identifying a partially sighted user comprises at least one of the following steps:
- the activation of a low vision mode by a double-tap gesture of the finger of said user on the screen of the terminal (2);
- the searching for the center of the keyboard on the touch screen (1) where an embossment (11) with a point, corresponding to the central key (100) of the virtual keyboard (10) of the terminal (2), is located;
- the determination of the positions of the other keys (101, 102, 103, 104) of the virtual keyboard (10) from said central key (100), by keeping the finger in contact with the touch screen (1) and moving it upward, downward, rightward, leftward or by a combination of said directions (up, down, right, left) to feel the other embossments of the touch screen representing the other keys;
- the choice and the storage of a desired key (100, 101, 102, 103, 104) by lifting the finger from the touch screen (1) at the position of said desired key (100, 101, 102, 103, 104);
- the validation of the choice of key made by a double-tap gesture anywhere on the touch screen (1);
- the validation of the code/PIN made up of all the choices validated by a double-tap gesture anywhere on the touch screen (1) and once the number of digits of the code corresponds to the number of validated key choices.

The method for identifying a partially sighted user may comprise, prior to the step of activating the low vision mode, a step of determining whether a user is a normal user (with normal vision) or a partially sighted user by means of an arrangement included in the identification device or the terminal. For example and without limitation, said arrangement may be an audio arrangement interacting with the user.

In some embodiments, the method for identifying a partially sighted user comprises steps of correcting choices when at least one wrong choice has been made, said steps comprising at least one of:
- the selection of the correction key (103) on the virtual keyboard (10) of the terminal (2) by moving the finger downward from the central key "5" (100) toward said correction key (103) located below the said digit
- the activation of said correction key (103) by a double-tap gesture on the touch screen (1) of the terminal (2);
- the emission of a signal or a voice to confirm the correction.

In some embodiments, the method for identifying a partially sighted user comprises steps of canceling a code/PIN or exiting the PIN entry mode, said steps comprising at least one of:
- the selection of the cancel key (102) on the virtual keyboard (10) by moving the finger downward from the central key "5" (100) toward said cancel key (102);
- the activation of said cancel key (102) by a double-tap gesture on the touch screen (1) of the terminal (2);
- the emission of a signal or a voice to confirm the cancellation of the operation.

The present application describes various technical characteristics and advantages with reference to the figures and/or to various embodiments. Those skilled in the art will understand that the technical characteristics of a given embodiment can indeed be combined with characteristics of another embodiment unless the reverse is explicitly mentioned or unless it is obvious that these characteristics are incompatible or that the combination does not provide a solution to at least one of the technical problems mentioned in the present application. In addition, the technical characteristics described in a given embodiment can be isolated from the other characteristics of this mode unless the reverse is explicitly mentioned.

It should be obvious to those skilled in the art that the present invention allows embodiments in many other specific forms without departing from the field of application of the invention as claimed. Consequently, the present embodiments should be considered by way of illustration, but may be modified within the field defined by the requested protection, and the invention should not be limited to the details given above.

The invention claimed is:

1. A device for identifying a user, comprising:
at least one terminal comprising
  at least one touch screen for displaying information related to at least one transaction or at least one service, the touch screen comprising at least one set of embossments;
  a location for inserting a smart card;
  a contact and/or contactless smart card reader device;
  a detection device configured to validate a double-tap gesture produced by a user's finger anywhere on the touch screen; and
  a main circuit board for controlling functionalities of the terminal and comprising at least one processor and at least one memory including a set of modules and/or algorithms, which, when executed by the processor, cause the at least one processor to:
  generate at least one interactive interface comprising at least one virtual keyboard, wherein the virtual keyboard is displayed at a position corresponding to the at least one set of embossments, such that the at least one set of embossments are superimposed on keys of the virtual keyboard and located around digits and/or symbols of the keys, including an embossment with a point in a center of a first set of nine keys, comprising digits, of the virtual keyboard,
  determine a position of a finger of the user on the touch screen,
  register in a first memory a last position of the finger after the user has removed the finger from the touch screen, the last position being defined as a possible choice of one of the keys corresponding to the last position registered in the first memory,
  activate a low-vision mode in response to the detection device validating the double-tap gesture, wherein the low-vision mode includes a discovery mode;
  while the low-vision mode and the discovery mode are active, ignore inputs generated by the user moving the finger on the touch screen; and
  deactivate the discovery mode in response to detecting that the user's finger is in contact with a central key of the virtual keyboard corresponding to the embossment with the point.

2. The device for identifying a user according to claim 1, wherein the low-vision mode is activated when the terminal is in a PIN entry mode.

3. The device for identifying a user according to claim 1, wherein
the at least one processor is configured to deactivate the discovery mode in response to detecting that the user's finger is in contact with the central key corresponding to a digit "5" of the virtual keyboard, and
positions of other keys, defined by a first part of the set of embossments corresponding to digits "0", "1", "2", "3", "4", 6", "7", "8", "9" and a second part of the set of embossments having symbols "<", "X" and "O", are determined from the central key by detecting the finger kept on the touch screen and moving upward, downward, leftward or rightward or by moving in at least two of up, down, left, and right directions toward a desired key.

4. The device for identifying a user according to claim 1, wherein the at least one processor is configured to compare a position of each choice of one of the keys registered in the first memory of the terminal with a predefined position of each key of the virtual keyboard before the each choice of one of the keys is validated by the detection device.

5. The device for identifying a user according to claim 1, wherein the terminal comprises at least an alarm connected to the detection device, the alarm configured to emit a beep signal when the detection device validates a choice of one of the keys.

6. The device for identifying a user according to claim 1, wherein the at least one processor is configured to set a first time duration for which the finger is in contact with the touch screen and a second time duration between two successive tap-gestures produced by the user's finger on the touch screen, so as to avoid an error in a process of validation of the choice of one of the keys when the first and second time durations exceed predefined values registered in the memory of the main circuit board.

7. The device for identifying a user according to claim 1, wherein
the virtual keyboard comprises at least a correction key, identified by a position of an embossment of the set of embossments having a symbol "<", which is configured to be activated in response to the detection device validating the double-tap gesture, and
the at least one processor is configured to correct a choice of one of the keys made by the user in response to the detection device detecting that the finger has been removed from the touch screen in the position identified as representing the correction key.

8. The device for identifying a user according to claim 7, wherein the at least one processor is configured to delete a last choice of one of the keys made by the user from the first memory when the correction key is activated.

9. The device for identifying a user according to claim 5, wherein the alarm of the terminal is configured to emit a signal with a lower frequency and a longer duration, distinguishable from the beep signal, when the choice of one of the keys made by the user has been deleted.

10. The device for identifying a user according to claim 1, wherein
the virtual keyboard comprises a cancel key, identified by a position of an embossment of the set of embossments having a symbol "X", which is configured to be activated in response to the detection device validating the double-tap gesture on the touch screen, and
the at least one processor is configured to cancel a code/PIN or to exit a PIN entry mode in response to the detection device detecting that the finger has been removed from the touch screen in the position identified as representing the cancellation key.

11. The device for identifying a user according to claim 10, wherein the at least one processor is configured to
delete the code/PIN from a second memory if the code/PIN has already been registered in the second memory or
exit the PIN entry mode if the code/PIN has not been registered in the second memory or if the choice has not been made when the cancel key is activated by the user.

12. The device for identifying a user according to claim 5, wherein the alarm of the terminal is configured to emit a signal when a code/PIN is canceled, the signal being different from the beep signal emitted when the choice is validated or from a signal emitted when a correction has been made.

13. The device for identifying a user according to claim 1, wherein after a code/PIN has been entered by the user, the at least one processor is configured to validate the code/PIN in response to the detection device validating the double-tap gesture on the touch screen.

14. The device for identifying a user according to claim 1, wherein the at least one processor is configured to cause the terminal to automatically exit a PIN entry mode when the PIN entry mode ends.

15. The device for identifying a user according to claim 3, wherein
the at least one set of embossments includes an embossment with a symbol "O" corresponding to an OK key of the virtual keyboard in a normal mode for the user with normal vision, and
the at least one processor is configured to, in response to the detection device validating a tap-gesture on the OK key,
validate a code/PIN typed using the virtual keyboard or confirm the at least one transaction or an instruction/information displayed on the touch screen.

16. The device for identifying a user according to claim 1, wherein the at least one processor is configured to automatically validate a code/PIN in response to the detection device validating that a predefined number of digits, registered in the memory, have been typed by the user.

17. The device for identifying a user according to claim 1, wherein the terminal further comprises an audio arrangement for providing audio assistance to the user of the terminal.

18. The device for identifying a user according to claim 17, wherein the audio arrangement comprises a voice assistance module, the at least one processor is configured to activate the voice assistance module, which says:
"ENTRY IN LOW VISION PIN ENTRY MODE" when the low-vision mode is activated;
"correction," when a correction of the choice has been made by activating a correction key; and
"OPERATION CANCELED," when a code/PIN or a PIN entry mode has been canceled by activating a cancel key.

19. A method for identifying a partially sighted user, in a device comprising the terminal according to claim 1, the method comprising the steps of:
activating the low-vision mode in response to the detection device validating the double-tap gesture on the touch screen;
determining that the finger is in contact with the central key of the virtual keyboard;
determining that the finger is kept in contact with the touch screen and moving upward, downward, rightward, leftward or by a combination of up, down, right, left directions to contact other embossments of the touch screen representing other keys of the virtual keyboard;

choosing and memorizing a desired key in response to determining that the finger is lifted from the touch screen at the position of the desired key;

validating a choice of one of the keys made by the user in response to the detection device validating the double-tap gesture anywhere on the touch screen;

determining that the number of digits of a code/PIN corresponds to the number of a plurality of validated choices; and validating the code/PIN made up of all choices validated by the double-tap gesture anywhere on the touch screen in response to the step of determining that the number of digits of the code/PIN corresponds to the number of the plurality of validated choices.

20. The method for identifying a partially sighted user according to claim 19, further comprising correcting at least one of the choices by at least:

detecting the finger moving downward from a central key "5" toward a correction key located below a digit "0" and contacting the correction key on the virtual keyboard;

receiving the double-tap gesture on the touch screen;

activating the correction key by the double-tap gesture received on the touch screen; and emitting a signal or a voice to confirm the correction.

21. The method for identifying a partially sighted user according to claim 19, further comprising canceling the code/PIN or exiting a PIN entry mode by at least:

detecting the finger moving downward from a central key "5" toward a cancel key and contacting the cancel key on the virtual keyboard;

receiving the double-tap gesture on the touch screen;

activating the cancel key by the double-tap gesture received on the touch screen of the terminal; and emitting a signal or a voice to confirm the cancellation.

22. A device for identifying a user, comprising:

at least one terminal comprising at least one touch screen for displaying information related to at least one transaction or at least one service, the touch screen comprising at least one set of embossments;

a location for inserting a smart card;

a contact and/or contactless smart card reader device;

a detection device configured to validate a double-tap gesture produced by a user's finger anywhere on the touch screen; and a main circuit board for controlling functionalities of the terminal and comprising at least one processor and at least one memory including a set of modules and/or algorithms, which, when executed by the processor, cause the processor to:

generate at least one interactive interface comprising at least one virtual keyboard, wherein the virtual keyboard is displayed at a position corresponding to the at least one set of embossments, such that the at least one set of embossments are superimposed on keys of the virtual keyboard and located around digits and/or symbols of the keys, including an embossment with a point in a center of a first set of nine keys, comprising digits, of the virtual keyboard, determine a position of a finger of the user on the touch screen, register in a first memory a last position of the finger after the user has removed the finger from the touch screen, the last position being defined as a possible choice of the key corresponding to the last position registered in the first memory, wherein the at least one processor is configured to activate a low-vision mode in response to the detection device validating the double-tap gesture on the touch screen;

correct at least one choice of input made by the user, by implementing a functionality among a set of low vision mode functionalities to:

detect the finger moving downward from a central key corresponding to a digit "5" toward a correction key located below a key corresponding to a digit "0" and contacting the correction key on the virtual keyboard of the terminal, receive the double-tap gesture on the touch screen of the terminal, and activate the correction key by the double-tap gesture received on the touch screen of the terminal; and cause the terminal to emit a signal or a voice to confirm the correction of the at least one choice of input.

* * * * *